Patented June 6, 1950

2,510,504

UNITED STATES PATENT OFFICE 2,510,504

PROCESS FOR THE MANUFACTURE OF ARTICLES MADE FROM CERAMIC OR SIMILAR MATERIALS

René Lecuir, Paris, France, assignor to Societe Francaise Radio Electrique, a corporation of France No Drawing. Application November 27, 1945, Serial No. 631,226. In France September 9, 1943

5 Claims. (Cl. 25—156)

1

The present invention relates to a process for the manufacture of articles from ceramics or similar materials.

The object of the invention is to produce articles of ceramic material in such manner that the degree of contraction of heated material may be predetermined at will so as to obtain articles having well defined properties. An impervious article, an article having a definite contraction, or even an article possessing at least to a degree both these qualities may be obtained.

Firstly, certain facts will be hereinafter set forth for the purpose of defining the field to which the invention relates and facilitating a true appreciation of the same. The principle upon which the invention is based may be deduced from the following explanation.

The contraction of a ceramic constituent after calcination is sometimes used to diminish the contraction of a ceramic mass without modifying the chemical composition of this mass. In this case, there are generally employed again the firing waste which, after being crushed, is introduced into the basic composition under the term "chamotte" in order to ensure the required degree of contraction. The contraction is obtained owing to the fact that in the material subjected to the final firing there exist two parts, one which has not already been fired and is capable of contraction, and the other which has been fired and which does not produce any contraction. The required amount of contraction is obtained by regulating the ratio of the two parts. The mixing in this usual method of operation takes place on moist products.

In the method of preparing ceramic products by baking of firing conglomerates of dry pulverulent constituents into which there enters an agglomerant, it has been found as a result of investigation arising from the present invention, that the contraction of any oxide depends upon its adsorbent power for the agglomerants used. This adsorbent power varies within wide limits according to the physical structure of the agglomerated power. This term of physical structure must be understood in its widest sense, that is to say, not only the more or less perfect crystalline structure of the powder used but also the more or less advanced degree of pulverisation of this powder, and all factors upon which its surface depends at the moment of agglomeration.

On the one hand, there is generally produced in the course of the calcination of an oxide an evolution in a dispersed form towards larger grains constituting a more or less perfect crystal

2 in consequence of the thermal agitation which facilitates the formation of larger crystalline grains.

On the other hand, the contraction made by the ceramic mass depends finally upon the manner in which the forces of molecular attraction can be exerted between the various solid surfaces of this mass.

In practice, it is sufficient for a crystallite to be separated from the adjacent crystallite by a distance of the molecular order, to place these two surfaces out of their respective domain of molecular attraction.

In general owing to the shape of the grains and the relative proportion of the grains of different dimensions, the surfaces corresponding to these conditions present a relatively constant distribution in the whole mass, which delimits the zones in which molecular attraction between the surfaces present cannot be exerted. The result is that the whole takes place as if there existed a certain number of centres of contraction fairly regularly distributed in the mass. The porosity of the fired article increases as the centres of contraction increase per units of volume.

In particular when the volatile agglomerant used is not absorbed at the moment when it has just been volatilised, its departure limits in the mass agglomerates of crystallites which are not found to be attached to one another.

It is thus that the agglomerant introduced in the form of the solid powder may modify the contraction by a simple mechanical phenomenon consequent upon whether it is or is not adsorbed by the basic powder. Comparative tests made using urea (agglomerant adsorbed by the basic powder by means of a suitable thermal treatment) and casein (agglomerant hardly adsorbed by the same powder) lead to the following result: by the use of urea there is obtained a contraction higher by 2% than by using the same weight of casein although the high pressures utilised at the moment of the agglomeration tend to diminish these differences of contraction.

Actually, when the agglomerant used is adsorbed by the basic powder, it causes the formation of capillaries, the destruction of which (by the volatilisation of the fused agglomerant) causes contact between surfaces previously limited by these capillaries. The same result can only be obtained in the absence of any agglomerant if it is possible at the moment when the pressure of agglomeration is exerted, to ensure contact between the surfaces of the various grains. Under these conditions, there should be obtained by suitable baking, articles having the desired imperviousness, since this generally results in the usual ceramic practice from the formation of a vitreous phase at the firing temperature used for this purpose.

Investigations in accordance with this invention have disclosed that it is possible to obtain articles, the imperviousness of which has been due to the tangling up of the fine crystals of the oxide used. This imperviousness can thus be obtained at a comparatively low temperature on pure refractory bodies since it is due to their crystallisation and does not depend upon the softening temperature of the oxide.

To obtain this result the sequence of operations to follow, according to the invention is as follows:—First a preliminary agglomeration and firing of the mass takes place, the conditions of which are determined experimentally in accordance with the imperviousness required. The object of this first operation is to bring the basic powder, by this firing, followed by a suitable grinding, to a physical structure such that the form of the grains and their relative dimensions may be determined in view of the final operation.

After grinding and adsorption of the agglomerant, moulding takes place according to the form desired followed by the final firing.

The experimental conditions are to be determined for each composition.

By way of example, the preparation will be described of articles with a base of titanium oxide.

The process is characterised:

(1) By the mixture of the volatile agglomerant with a basic powder by dry means and the agglomeration of the titanium oxide after adsorption of the agglomerant according to French Patent applied for on April 24, 1942 for "Process of agglomeration applicable to ceramic and other substances and products arising therefrom."

(2) By the production of articles in titanium oxide assaying at more than 99% of $TiO_2$ with the exclusion of any addition playing the part of flux, but having nevertheless the desired compactness, for example to obtain a high dielectric coefficient and a low factor of dielectric losses, a compactness which it has not yet been possible to obtain starting with pure titanium oxide by dry means. This compactness is obtained, according to the invention, by producing preliminarily a titanium oxide of physical structure determined before its use in the moulding of the desired object.

The factors upon which the porosity depend are: the dimensions proper of the agglomerated particles and their relative dimensions, the agglomeration pressure, the more or less perfect adsorption of the grains by the agglomerant and the firing itself.

The sequence of the operations will, for example, be as follows:

The titanium oxide used is the "Kronos" titanium oxide which essays more than 99% of titanium oxide after calcination. There is added to this product 20% of urea which is mixed and ground for two hours in the ball mill and treated at a temperature of 138° C. for 30 minutes in a cubic mixer and agglomerated in the form of discs under a pressure of 1,000 kilogrammes per square centimètre.

The powder is passed through the cubic mixer at a suitable temperature for 30 minutes. It is sifted afresh through a 100 sieve (French standard sieve), agglomerated under a pressure of 2,500 kilogrammes per square centimètre and fired for eight hours at 1400° C. The articles obtained in this way are impervious.

These discs are fired at a temperature which is well determined, variable with the dimensions of the disc and the volume of the furnace. In certain experiments the furnace was 160 mm. in diameter and the discs were of cylindrical shape, 5 cm. in diameter by 1 cm. thick. They were fired at 1260° C. for 20 minutes, this temperature being itself gradually attained in 12 hours.

After cooling, the discs are broken up and rotated in the ball mill for 12 hours. The powder obtained is then passed through a 300 sieve (French standard sieve), mixed with 20% of urea and ground afresh for 2 hours.

The powder is passed in the cubic mixer at a suitable temperature for 30 minutes. It is sieved afresh on a 100 sieve agglomerated under a pressure of 2,500 kilogrammes per square centimètre and fired for eight hours at 1400° C. The articles thus obtained are impervious.

Urea is employed because it possesses the following properties:

1. It acts as an agent for wetting the powdered refractory material with which it has been previously mixed by careful mechanical mixing. In other words, when it is brought to a liquid state by melting, it drives off the gases adsorbed by the surface of the powder by substituting itself for those gases.

2. In the solid state, urea can be agglomerated by pressure. By reason of this fact, the grains of refractory powder can be agglomerated after each grain has been coated with a film of urea, first by melting the urea, then by cooling it again to the solid state.

3. Urea is volatile at a relatively low temperature which allows its elimination in the course of firing.

Urea does not need a porous refractory mass after it has been eliminated in the course of the firing operation because slow progressive heating is employed for firing, giving rise to an increase of temperature of about 100° C. per hour. At the inception in this firing, urea melts and capillary tubes are constituted between the grains of the refractory mass, these tubes being filled with liquid. Thereafter, the liquid is gradually eliminated by being vaporized in the free ends of the capillary tubes and the surface of the said grains draw closer together until they stand separated by a distance corresponding to molecular attraction so that they end up by having several points of direct contact. At the higher temperatures, the contact surfaces of the grains are so to speak welded together by diffusion. Between the grains there remains certain spaces which are identical when the same operations are inserted for different batches of refractory mass. These spaces obviously do not confer a porous character to the grains of the refractory mass.

The urea melts at 133° C. and is decomposed at a higher temperature. In the course of melting the urea, a certain proportion is destroyed by decomposition, but this is in no way disadvantageous since it will be sufficient to start deliberately with a larger quantity of urea than that necessary for wetting the surface of the refractory mass for which reason the percentage of urea present in the powder before agglomeration will be constant while the quantity of urea lost by decomposition will always be the same.

According to a modification of the invention, instead of using a pure oxide as the basic powder, there is used a mixture of refractory oxides.

On the other hand, according to another modification, it is arranged to use the process according to the invention in combination with the other ordinary processes where the contraction is determined by the formation of a chemical combination or of a vitreous phase. The use of clayey products is not excluded by the fact that their presence is not necessary.

For example, there may be used as a basic powder a mixture of titanium oxide and magnesium oxide forming the well defined crystalline composition $TiO_2, 2MgO$. The method of preparing impervious articles having this composition is exactly the same as that used for titanium oxide. Only the temperature of the first firing which leads to the desired structure of the mixture is different. This temperature is then 1220° C. for 20 minutes instead of 1260° C.

According to another modification of the present invention, the process according to the present invention may be carried into effect in such manner as to obtain articles having a definite and constant contraction, if necessary approximately zero, which enables articles with strictly predetermined sides and series of articles strictly interchangeable being obtained by moulding.

In this case, there is preferably employed an initial material of a base of magnesia and arrangements are made to obtain a perfectly stable basic powder the specific gravity of which does not vary by calcination.

This condition is in general only obtained by raising the initial material to an exceptionally high temperature, the greater the degree of purity of the product employed, the higher the temperature.

Efforts have been made to obtain the same result by utilising urea as a binder under high pressures. It is in this way that it has been possible to obtain only by maintaining for three hours a temperature of 1400° C., a magnesia fulfilling the conditions required.

Efforts have also been made, on the other hand, to increase the compactness of the mass treated by the addition in very small quantities of certain products. The additions which have given the most advantageous results are titanium oxide, beryllium oxide, zinc oxide and phosphoric anhydride, the latter introduced in its free or combined form. But the study of the size of the crystalline grains obtained under the same conditions, a study carried out by means of X-rays, has shown that these additions modify the crystalline structure of the mass according to a mechanism differing one from the other. The additions capable of giving rise under the conditions of the test, to the formation of a definite compound as for example $TiO_2$ and $P_2O_5$, considerably facilitates the enlargement of the grains by the welding together of the adjacent particles. On the other hand, the additions such as ZnO and BeO which do not combine with magnesia under the conditions of the test constitute a physical obstacle to the enlargement of the grains, from which results the formation of very fine grains.

Now, it has been said that it was generally advantageous in a ceramic mass to have a very fine crystalline grain structure by reason of a better resistance to variations of temperature and less porosity resulting from the collecting together of fine crystals. It is consequently suggested to this end to add a small quantity of an inert material constituting a physical obstacle to the enlargement of the crystalline grains. A contrary procedure would be carried out by the addition of a compound capable of giving rise to a combination with the basic constituent if the object sought was to create crystals of large dimensions.

For example, in constituting a mass responding in weight to the following composition—MgO=99, Zn=0.5, GlO=0.5. there is obtained after agglomeration under a pressure of the order of 2000 kilogrammes per square centimètre and firing for three hours at 1400° C., an exceptionally refractory mass having the same translucency as porcelain, and furthermore bereft of porosity which cannot be obtained by the use of one of these additions used alone.

This product, independently of any other possible utilisation, constitutes an initial material of exceptional stability permitting the manufacture after grinding and using urea as agglomerant under agglomeration pressures of the order of 1000 kilogrammes per square centimètre, of articles, the dimensions of which after firing at 1260° C. are constant within about 0.25%.

Naturally, the invention is capable of many modifications of application within the scope of the indications given.

What I claim is:

1. Process for the manufacture of articles of ceramic material in which the treated material has a predetermined degree of contraction so as to obtain articles having well defined properties comprising the steps of mechanically mixing the ceramic material in powder form with a fusible and volatile powdered binder so as to form a homogeneous and intimately mixed powder; uniformly heating throughout its mass said resultant mixed powder at a relatively low temperature sufficient to fuse the binder, the wetting power of said binder in fused state being so high that a part of it will thereupon wholly drive out the gases adsorbed by the particles of ceramic material and become adsorbed in their place, the remaining part providing a regular coating on said particles; agglomerating the mass under a pressure of the order of one to several tons per square centimeter, in the cold state, baking the agglomerate in pieces with gradual and continuous increase of the temperature to an ultimate firing temperature substantially lower than the softening point of the ceramic material, so as during said increase progressively to vaporise and drive off the whole of the binder from the mass; grinding the baked product into a fine powder, mixing the said powder with the aforesaid powdered binder, agglomerating and molding it into the desired shape, at a predetermined temperature, and baking the molded product at a temperature accurately determined with regard to the latter temperature so as to ensure the desired degree of contraction in a uniform manner throughout the whole mass of the latter.

2. Process according to claim 1 wherein the ceramic material comprises at least one substance selected from the group consisting of pure titanium oxide and pure magnesium oxide, and the binder used is urea.

3. Process according to claim 2 wherein the ceramic material is constituted by a mixture of titanium oxide and magnesium oxide in the proportion necessary for obtaining a well defined crystalline composition corresponding to the formula $TiO_2, 2MgO$.

4. In a process according to claim 1, for obtaining an article having a constant degree of contraction, the ceramic material used comprising magnesium oxide as major constituent, the incorporation in the ceramic material of a small percentage of at least one of the oxides selected from the group consisting of beryllium oxide, zinc oxide, phosphoric anhydrid, titanium oxide, the first firing temperature being chosen so as to obtain as the said starting ceramic material, a powder the specific gravity of which is no longer liable to vary by direct calcination.

5. Process for the manufacture of articles of ceramic material having predetermined dimensions, enabling a series of articles interchangeable with one another to be obtained, comprising the steps of mechanically mixing a powdered ceramic material comprising a mixture of 99% magnesium oxide, 0.5% zinc oxide and 0.5% beryllium oxide with urea in an amount equal to 20% by weight of the resulting mass so as to form a homogeneous and intimately mixed powder, heating said resultant mixed powder in a rotating mixer the axis of which is slightly inclined from the horizontal at a temperature of the order of 138° C., whereby the urea is completely melted, agglomerating the mass under a pressure of the order of one to several tons per square centimeter, in the cold state, baking the agglomerate with gradual and continuous increase of the temperature to an ultimate firing temperature of 1400° C., grinding the baked product into a fine powder, mixing the said powder with the aforesaid powdered binder, agglomerating and molding it into the desired shape, at a predetermined temperature, and baking the molded product at a temperature accurately determined with regard to the latter temperature so as to ensure the desired degree of contraction in a uniform manner throughout the whole mass of the latter.

RENÉ LECUIR.

REFERENCES CITED

The following references are of record in the file of this patent:

UNITED STATES PATENTS

| Number | Name | Date |
|---|---|---|
| 2,122,960 | Schwartzwalder | July 5, 1938 |
| 2,313,746 | Heany | Mar. 16, 1943 |

FOREIGN PATENTS

| Number | Country | Date |
|---|---|---|
| 489,981 | Great Britain | Aug. 3, 1938 |
| 519,885 | Great Britain | Apr. 9, 1940 |